(12) United States Patent
Sabato

(10) Patent No.: US 6,752,552 B1
(45) Date of Patent: Jun. 22, 2004

(54) LOCATING KEY FOR A KEYBOARD OR KEYPAD

(76) Inventor: Alberto B Sabato, 21 Clanalpine Street, Mosman, New South Wales 2088 (AU)

( * ) Notice: Subject to any disclaimer, the term of this patent is extended or adjusted under 35 U.S.C. 154(b) by 323 days.

(21) Appl. No.: 09/913,105

(22) PCT Filed: Jun. 21, 2000

(86) PCT No.: PCT/AU00/00691

§ 371 (c)(1),
(2), (4) Date: Nov. 20, 2001

(87) PCT Pub. No.: WO00/78551

PCT Pub. Date: Dec. 28, 2000

(30) Foreign Application Priority Data

Jun. 21, 1999 (AU) ............................................... PQ1115
Dec. 8, 1999 (AU) ............................................... PQ4525

(51) Int. Cl.[7] .................................................. B41J 5/12
(52) U.S. Cl. ...................................... 400/490; 400/472
(58) Field of Search ................................ 400/490, 472, 400/489, 488, 486, 473, 494, 483; 341/22, 21; 361/680; 345/168, 169; D14/391; 364/709.12; 235/145 R, 146

(56) References Cited

U.S. PATENT DOCUMENTS

| 1,041,696 A | 10/1912 | Summerville | 400/494 |
|---|---|---|---|
| 1,718,694 A | 10/1925 | Kurowski | 400/483 |
| 1,823,130 A | 11/1928 | Smith | 400/483 |
| 2,350,059 A | 4/1942 | Messchaert | 197/101 |
| 3,396,827 A | 9/1962 | Harwell | 197/98 |
| 3,848,723 A | 11/1974 | Hogue | 197/102 |
| 4,180,336 A | 12/1979 | Lonsdale | 400/491.3 |
| 4,762,436 A | 8/1988 | Herzog et al. | 400/491.3 |
| 4,778,295 A | * 10/1988 | Bleuer | 400/485 |
| 4,994,992 A | 2/1991 | Lapeyre | 364/709.15 |
| 5,515,763 A | 5/1996 | Vandervoort | 84/433 |
| 5,583,497 A | 12/1996 | Hankes | 341/22 |
| 5,610,602 A | 3/1997 | Hargreaves | 341/22 |
| 5,689,253 A | 11/1997 | Hargreaves et al. | 341/22 |

FOREIGN PATENT DOCUMENTS

| GB | 2087313 | 5/1982 |
|---|---|---|
| GB | 2134042 | 8/1984 |
| WO | 8102272 | 8/1981 |

* cited by examiner

*Primary Examiner*—Anthony H. Nguyen
(74) *Attorney, Agent, or Firm*—Ladas & Parry

(57) ABSTRACT

Key (21) for a keyboard or keypad, having an upper finger engaging surface (2) of generally square or rectangular configurations so as to have a top edge portion (3) remote from a user, a bottom edge portion (4) adjacent the user, a left edge portion (5) and a right edge portion (6), the key further having a ridge (22) adjacent the top edge portion (3) or the bottom edge portion (4) and extending longitudinally generally parallel thereto, and a ridge on the left or right portion (5, 6). The keys may be arranged on a keyboard or keypad to provide tactile identification of rows or blocks of keys.

8 Claims, 10 Drawing Sheets

LOCATING KEY FOR A KEYBOARD OR KEYPAD

FIELD OF THE INVENTION

The present invention relates to keys on a keyboard or keypad. More particularly, through not exclusively, the invention relates to locating keys for a computer or electronic keyboard or keypad which improves keyboard/keypad operating skills.

BACKGROUND OF THE INVENTION

A substantial number of modern electronic devices are equipped with a keyboard or keypad of some sort for manually inputting commands into the devices. The most common form of keyboard is that of the common household and business PC keyboard and the most common form of keypad is that of a phone.

Referring to the keyboard, the most widely recommended method of input using one of the common keyboards in the "touch typing" method. This method simply trains a user to memorise the keyboard layout so thoroughly that they may type using all their fingers without looking at the keyboard. This method is achieved by constant practice and assigning each finger to a particular groups of keys.

In particular, the "touch typing" method places each respective finger lightly on a "home" key, for example, in the "qwerty" keyboard these home keys are "asdf" and "jkl;" from left to right. The thumbs are than placed over the space. Each finger rests lightly on its home key and does not move unless it reaches to strike keys immediately above or below the home key or in the case of each of the index fingers, the keys immediately to the side of the home key, then the finger quickly returns to its home key. Thus, each finger has only certain keys that it should strike.

Untrained keyboard operators use what is called the "hunt and peck" system. Usually they use only their two forefingers or at most their four best fingers, the forefingers and middle fingers. This method requires that the typist keeps their eyes on the keyboard and this affects productivity. Although some of these typists can type about as fast as touch typists, very fast hunt and peck typing is more tiring than for the touch typist because the hands have to leap all around the keyboard to reach all the keys with only two or four fingers. In summary, to "keyboard" correctly, the typist must use the touch typing method described above. There is no middle ground in proper typing; if the typist is not typing correctly, he is typing incorrectly. Similar problems arise in the use of keypads.

In an attempt to overcome the shortenings of some of the prior art, many alternate shaped keyboards have been developed. One such keyboard is the KINESIS keyboard (for example, U.S. Pat. No. 6,005,496 to Hargreaves, et al.) which describes a keyboard having two wells for the receipt of the right and left hands of a user. The advantage of such a keyboard is that the location of the wells allows a user's arms to extend straight out in front of the user thereby reducing the need for the user to move his or her hands along the keyboard. However, these types of keyboards are complicated to operate and rely on the user to memorise key combinations and macros.

Many other patterns such as U.S. Pat. No. 1,823,130; U.S. Pat. No. 3,396,827; U.S. Pat. No. 3,848,723; U.S. Pat. No. 5,515,763 and U.S. Pat. No. 4,180,336, for example, describe keys for keyboards having top surfaces including longitudinal ridges, slots, rows of ridges, knobs, craters and texturing. Various combinations of texturing are also known.

Therefore, there still remains a need in the art for a keyboard and keypad that "forces" a typist to touch type correctly thus reducing typing inaccuracies and so minimizing strain and effort.

OBJECT OF THE INVENTION

It is an object of the present invention to overcome or ameliorate some of the disadvantages of the prior art, or at least to provide a useful alternative.

SUMMARY OF THE INVENTION

There is disclosed herein a key for a keyboard or keypad, said key having an upper finger engaged surface of generally square or rectangular configuration so as to have a top edge portion remote from a user, a bottom edge portion adjacent the user, a left edge portion and a right edge portion, said key further having:

a ridge adjacent said top edge portion or said bottom edge portion and extending longitudinally generally parallel thereto; and a ridge on said left or said right edge portion.

There is further disclosed herein a keyboard or keypad including at least three rows of keys including a top row which is remote from a user, a middle row, and a bottom row which is adjacent the user, each row having at least three keys including a left and a right end key, each key having an upper finger engaged surface of generally square or rectangular configuration so as to have top and bottom edge portions extending generally parallel to the rows, and left and right edge portions extending generally normal to the rows, and wherein the keys include:

(i) a ridge on the top left end key adjacent the upper edge portion thereof extending generally parallel to the rows, (ii) a ridge on the top left end key adjacent the left edge portion thereof extending generally normal to the rows, (iii) a ridge on the bottom left end key adjacent the left edge portion thereof extending generally normal to the rows, (iv) a ridge on the bottom left end key adjacent the bottom edge portion thereof extending generally parallel to the rows, (v) a ridge on the bottom right end key adjacent the bottom edge portion thereof extending generally parallel to the rows, (vi) a ridge on the bottom ridge end key adjacent the right edge portion thereof extending generally normal to the rows, (vii) a ridge on the top right end key adjacent the right edge portion thereof extending generally normal to the rows, and (viii) a ridge on the top right end key adjacent the upper edge portion thereof extending generally parallel to the rows.

There is still further disclosed herein a Qwerty keyboard having a plurality of alphanumeric keys arranged in three linear rows including a top row which is remote from a user, a middle row, and a bottom row which is adjacent the user, each row having a left and a right end key, each key having an upper finger engaged surface of generally square or rectangular configuration so as to have top and bottom edge portions extending generally parallel to the rows, and left and right side edge portions extending generally normal to the rows, the keys being positioned in a left first set and a right second set, the first set including the three left end keys and at least the next two adjacent keys of each row, the second set including the three right end keys and the next adjacent two or three keys spaced toward the first set so that the two sets are spaced by two, three or four keys, and wherein the keys of said first set include:

(i) a ridge on the top left end key adjacent the upper edge portion thereof extending generally parallel to the rows, (ii) a ridge on the top left end key adjacent the left edge portion thereof extending generally normal to the rows, (iii) a ridge on the middle left end key adjacent the left edge portion thereof extending generally normal to the rows, (iv) a ridge on the bottom left end key adjacent the left edge portion thereof extending generally normal to the rows, (v) a ridge on the bottom left end key adjacent the bottom edge portion thereof extending generally parallel to the rows, (vi) a ridge on the next adjacent or next two adjacent keys to said bottom left end key of the bottom row adjacent the bottom edge portion thereof extending generally parallel to the rows, (vii) a ridge on the next adjacent or next two adjacent keys to said bottom left end key of the bottom row adjacent the bottom edge portion thereof extending generally parallel to the rows, (viii) a ridge on said last mentioned key adjacent the right edge portion thereof extending generally normal to the rows, (ix) a ridge on the middle key next adjacent to said last mentioned key adjacent the right edge portion thereof extending generally normal to the rows, (x) a ridge on the top key next adjacent said last mentioned key adjacent the right edge portion thereof extending generally normal to the rows, (xi) a ridge on said last mentioned key adjacent the top edge portion thereof extending generally parallel to the rows, (xii) a ridge on the or each top key between said last mentioned key and said top left end key adjacent the top edge portion thereof extending generally parallel to the rows, and the keys of said second set include:

(i) a ridge on the top right end key adjacent the upper edge portion thereof extending generally parallel to the rows, (ii) a ridge on the top right end key adjacent the right edge portion thereof extending generally normal to the rows, (iii) a ridge on the middle key adjacent said top right key adjacent the right edge portion thereof extending generally normal to the rows, (iv) a ridge on the bottom right end key adjacent the right edge portion thereof extending generally normal to the rows, (v) a ridge on the bottom right end key adjacent the bottom edge portion thereof extending generally parallel to the rows, (vi) a ridge on the next adjacent or next two adjacent keys to said bottom right end key of the bottom row adjacent the bottom edge portion thereof extending generally parallel to the rows, (vii) a ridge on the next adjacent bottom key adjacent the bottom edge portion thereof extending generally parallel to the rows, (viii) a ridge on said last mentioned key adjacent the left edge portion thereof extending generally normal to the rows, (ix) a ridge on the middle key next adjacent to said last mentioned key adjacent the left edge portion thereof extending generally normal to the rows, (x) a ridge on the top key next adjacent said last mentioned key adjacent the left edge portion thereof extending generally normal to the rows, (xi) a ridge on said last mentioned key adjacent the top edge portion thereof extending generally parallel to the rows, (xii) a ridge on the or each top key between said last mentioned key and said top right end adjacent the top edge thereof extending generally parallel to the rows.

BRIEF DESCRIPTION OF THE DRAWINGS

A preferred form of the present invention will now be described by way of example with reference to the accompanying drawings, wherein.

DESCRIPTION OF AN EMBODIMENT OF THE PREFERRED INVENTION

Figure 1:
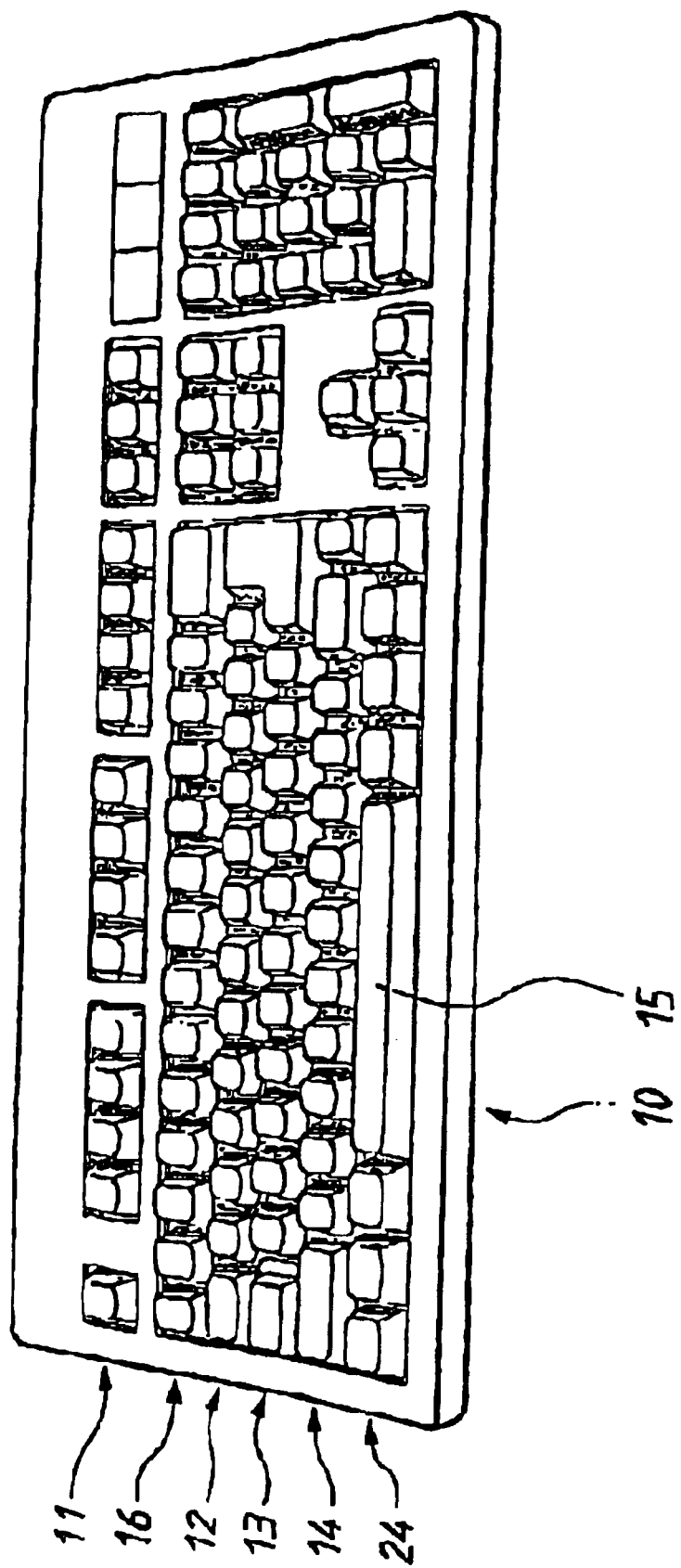
FIG. 1 is a perspective view of a typical standard QWERTY keyboard.

The improved keyboard is the result of specific modifications in an original standard keyboard. The original keyboard 10 is in common use, and an example is illustrated in FIG. 1. For clarity, the generally accepted geometrical design of the standard keyboard will first be described in order to provide a foundation for understanding the geometry of the improved keyboard. However, while the modifications of the present invention are most likely to be applied to the standard keyboard, it must be noted that these same modifications may be applied in many other keyboard designs as well.

The keys of the standard keyboard 10 are generally identical in shape and size, except for the outer function and modifier keys which are usually horizontal elongated in order to give the complete standard keyboard a generally rectangular appearance. A normal key includes an upper finger engaging surface 2 of a generally square or rectangular configuration having a top edge portion 3 remote from a user, a bottom edge portion 4 adjacent a user, a left edge portion 5 and a right edge portion 6.

The standard keyboard generally consists of a main alphanumeric body of at least three, but usually five, parallel, horizontal rows of keys (FIG. 1). At least three rows could consists of a top row remote from a user, a middle row and a bottom row adjacent a user, the rows generally consisting of a series of alphanumeric keys followed by a series of function keys. For example, in FIG. 1, each of the three middle rows 12, 13, 14 include a sequence of alphabetical and grammatical characters (such as the QWERTY or Dvorak sequence), bordered on the end of each row by modifier or function keys of some sort. That is, row 12 remote from the user has its alphanumeric keys starting with Q on the far left edge and finishing with P on the far right edge. Row 13 is an intermediate row and has its alphanumeric keys starting with A on the far left edge and finishing with L on the far right edge. Similarly, row 14 being adjacent a user has its alphanumeric keys starting with Z on the far left edge and finishing with M on the far right.

The lowest row of keys 24, positioned closest to the typist (i.e., adjacent the user) and immediately under the lower of the middle three main rows 14, is generally made up of modifier or function keys on either end of a long spacebar 15. The second highest row of keys 16, positioned above the upper of the middle three main rows 12, is generally made up mainly of numerical keys. The highest row 11 (remote from the user) is normally made up of function keys.

While the horizontal rows 16, 12, 13, 14, 24 of the standard keyboard are usually aligned without deviation, the vertical alignment of the keys is usually staggered, and it is this specific juxtaposition of horizontal and vertical key relationships which make up the geometry of the standard keyboard 10 (FIG. 1). In particular, the reference for the vertical alignment shift is generally the home row, or middle row 13. The row 14 immediately beneath the home row, generally the lower alphabetical row, is usually organised in such a way that the keys of this row have their midpoints oriented in vertical alignment with or near the space between the keys of the home row 13. The row 12 immediately above the home row 13, generally the upper alphabetical row, is usually organised in such a way that the keys of this row have their midpoints oriented in vertical alignment with or near the left one third vertical divider of the keys of the home row 13. Finally, the row 16 immediately above the upper alphabetical row 12, which is the row above the home row 13, is usually organised in such a way that the keys of this row 16 have their midpoints oriented in vertical alignment with or near the space between the keys of the row 12 immediately beneath them.

This general key relationship is the essence of what is usually referred to as the standard keyboard geometry (FIG. 1). While the specific organisation of the alphanumeric characters assigned to the keys of such a keyboard may vary, this does not affect the geometrical description of the keyboard 10, or its applicability to the modifications of the improved keyboard.

Figure 3:
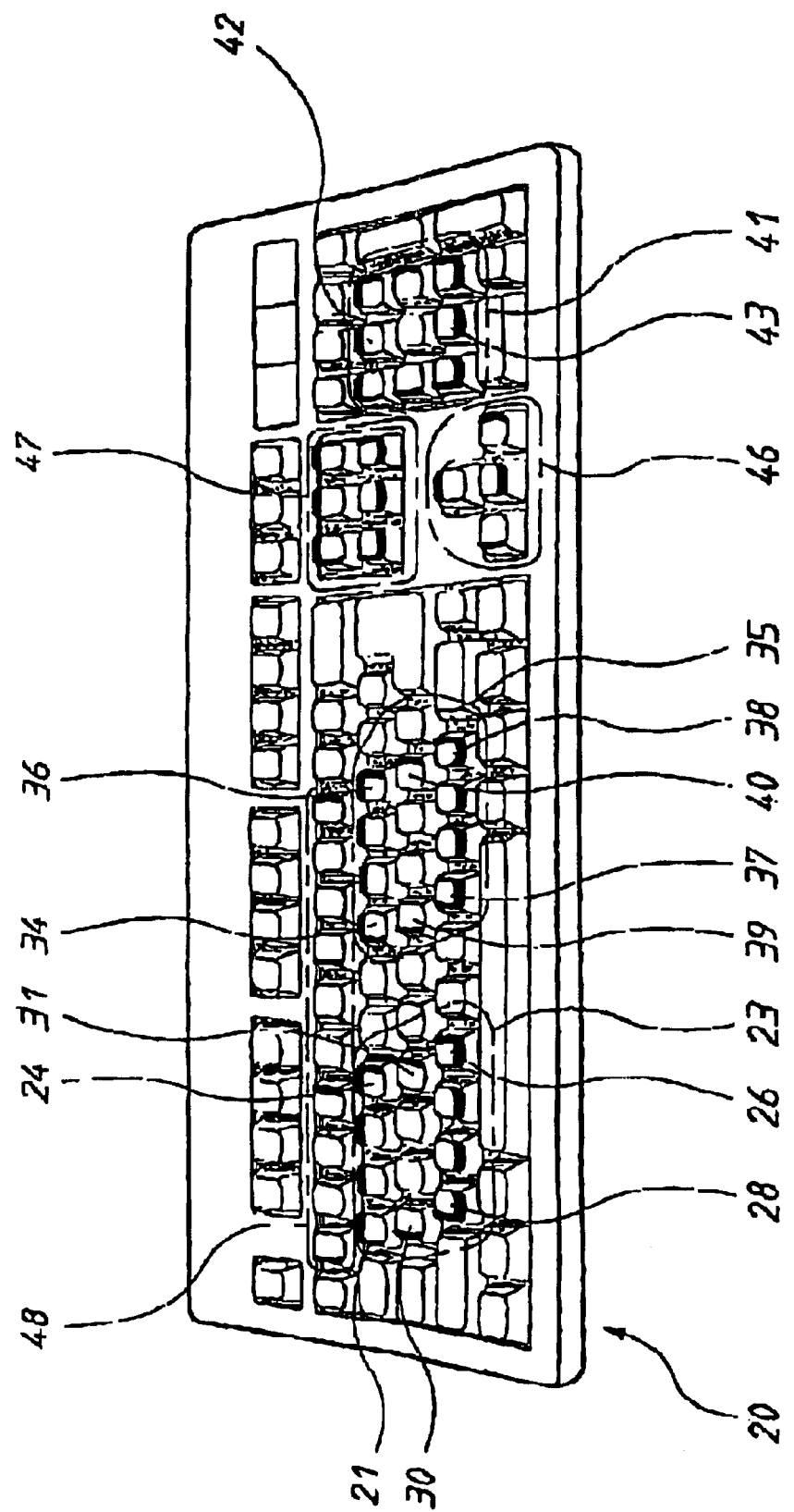
FIG. 3 is a perspective view of an improved QWERTY keyboard made in accordance with the present invention.

The foundation of the improved keyboard 20 the subject of at least a preferred embodiment of this invention, one variation of which is shown in FIG. 3, is the idea of providing certain keys with the means of generating a specific feedback. The feedback differs according to the position of the key and is such that the feedback of certain keys together, creates a virtual "box" within which the fingers can travel. In other words, the keys are so modified that a "wall" is created, which wall the fingers sense and within which wall they are guided (and almost forced) to operate. Therefore, not only the specific design of the keys gives the typist the exact feel for where the finger is, but also the keys are so modified that they almost "force" the typist to stay within the "walls" that the modifications have created.

This in turned facilitates (and almost forces) the use of specific fingers on specific keys end eventually makes a typist proficient in the use of the connect fingers and thus proficient in touch typing.

Figure 2A:
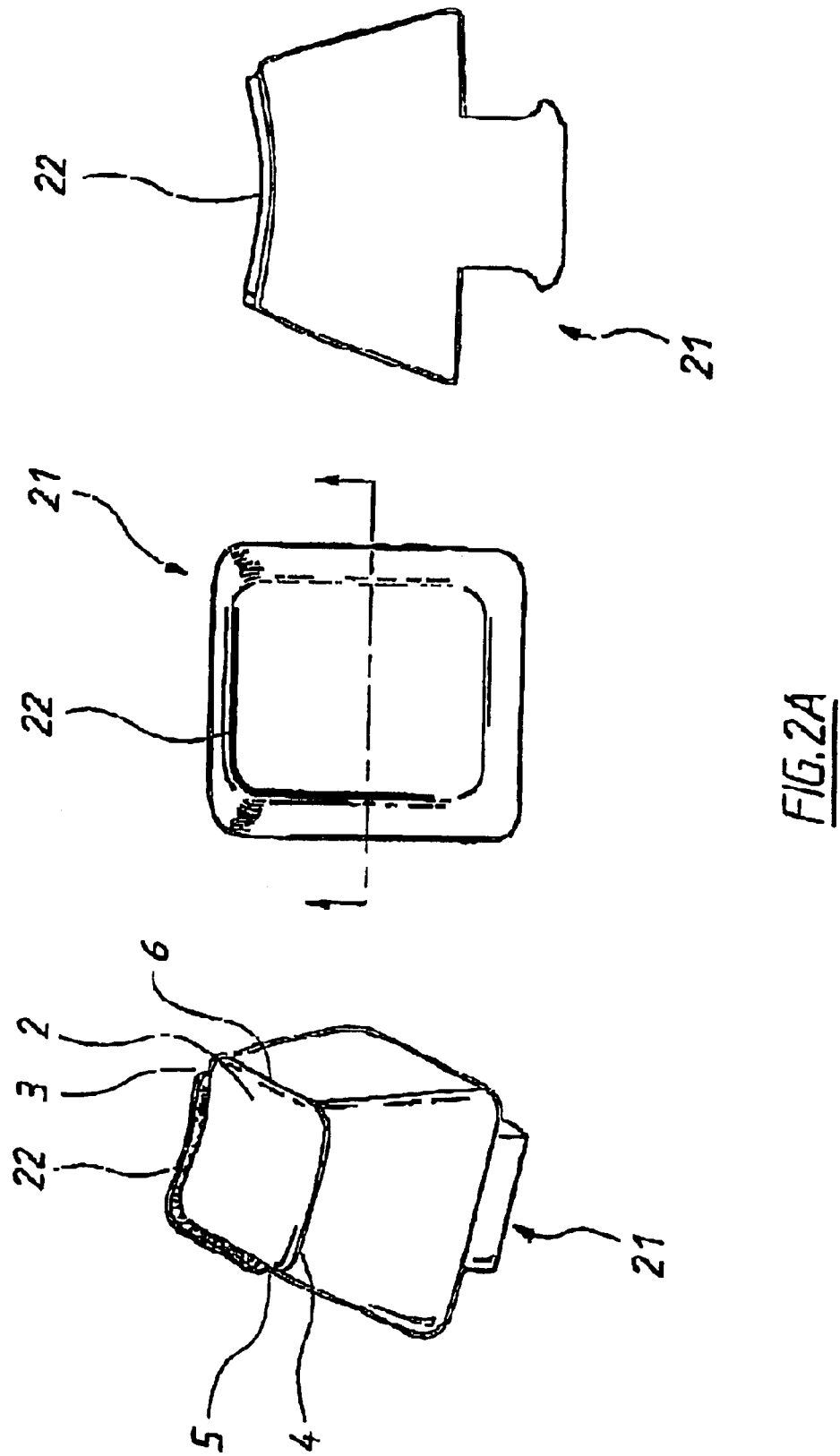
FIGS. 2A through 2H are schematic diagrams showing how certain keys of the QWERTY keyboard are modified in order to provide a positive feedback according to the present invention.

In the embodiment described here, the following keys of the standard QWERTY keyboard have been modified:

1. The key "Q" 21 has a generally "L" shaped ridge 22 applied to the top border and to the left border (FIG. 2A). The ridge 22 is designed so that it will provide a finger with the feedback information that it has reached a specific position on the keyboard 20 namely, the upper left corner of an imaginary rectangular box 23 formed by the keys Q, W, E, R, F, V, C, X, Z, A. It should be noted, however, that the "L" shaped ridge could be formed by two separate ridges, one on the top border and one on the left border.

Figure 2B:
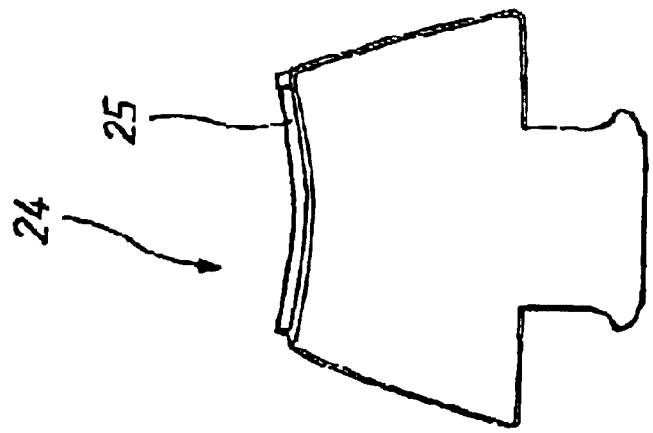
Figure 2B:
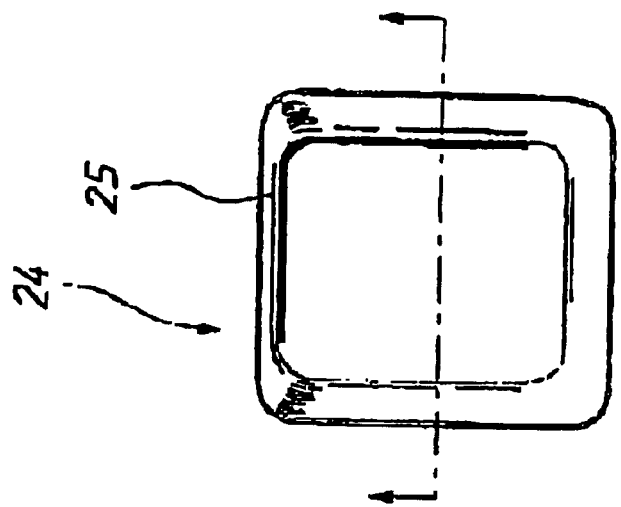
Figure 2B:
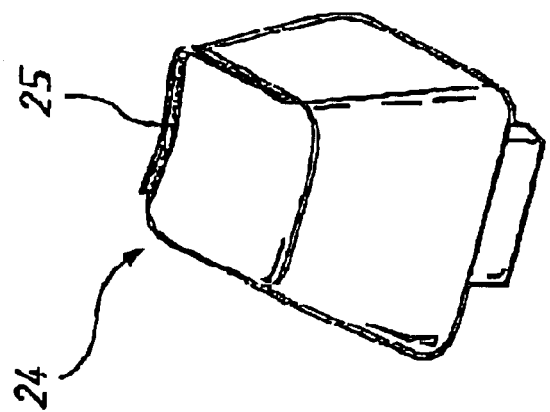

2. The key "R" 24 has a generally "L" shaped ridge 25 applied to the top border and to the right border (FIG. 2B). The ridge 25 is designed so that it will provide a finger with the feedback information that it has reached a specific position on the keyboard 20 namely, the upper right corner of the same imaginary rectangular box 23 described in 1 above. It should be noted, however, that the "L" shaped ridge could be formed by two separate ridges, one on the top border and one on the right border.

Figure 2C:
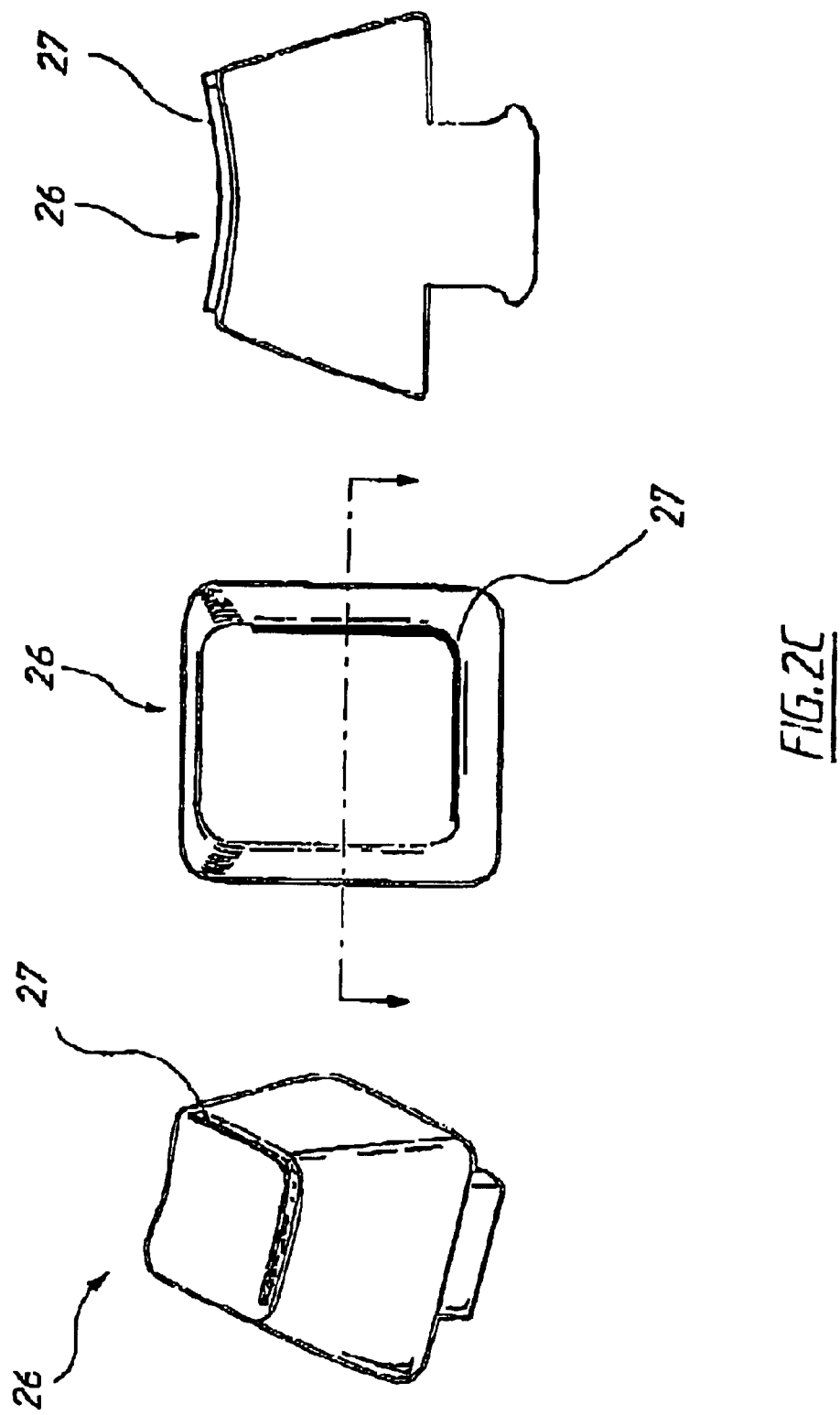

3. The key "V" 26 has a generally "L" shaped ridge 27 applied to the bottom border and to the right border (FIG. 2C). The ridge 27 is designed so that it will provide a finger with the feedback information that it has reached a specific position on the keyboard 20 namely, the lower right corner of the same imaginary rectangular box 23 described in 1 above. It should be noted, however, that the "L" shaped ridge could be formed by two separate ridges, one on the bottom border and one on the right border.

Figure 2D:
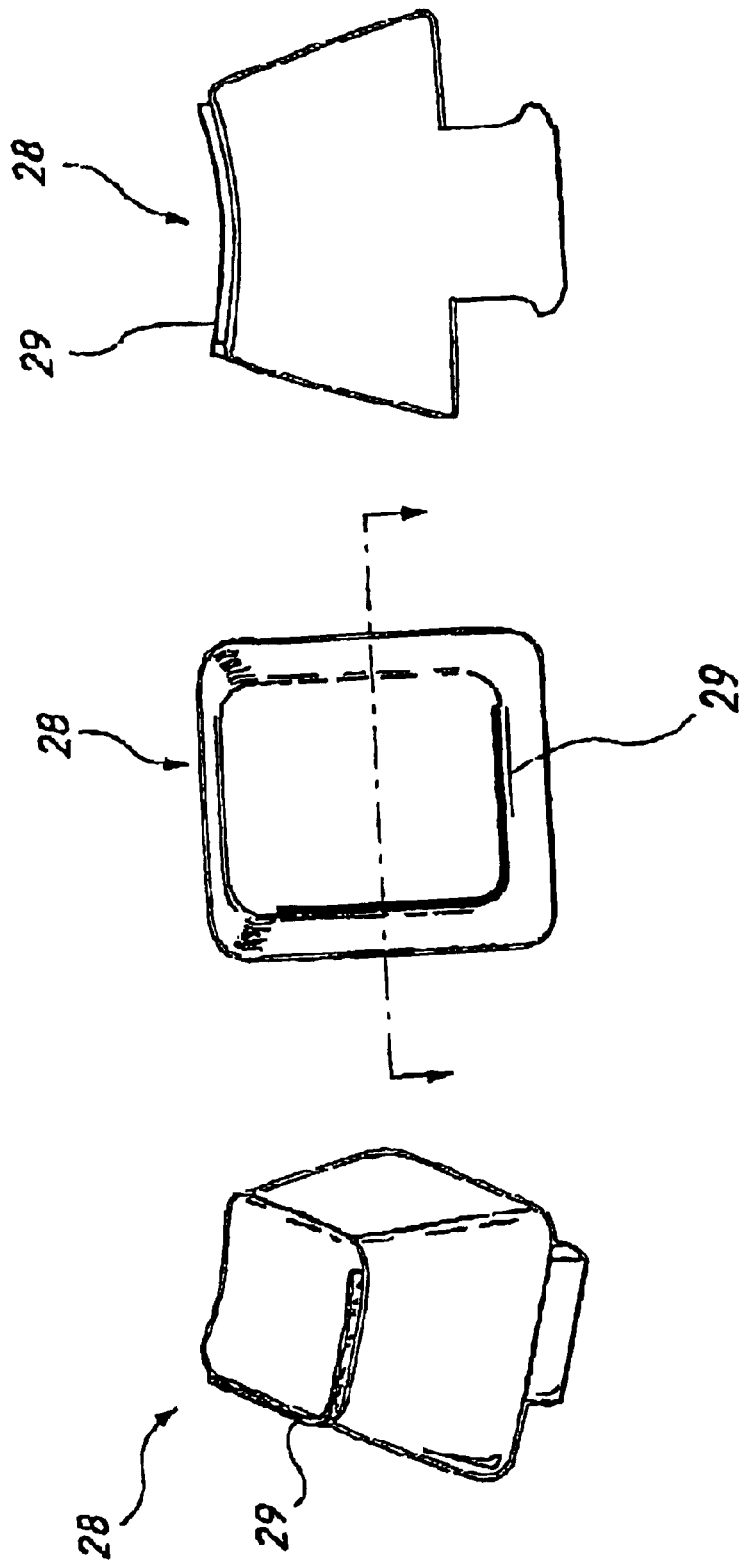

4. The key "Z" 28 has a generally "L" shaped ridge 29 applied to the bottom border and to the left border (FIG. 2D). The ridge 29 is designed so that it will provide a finger with the feedback information that is has reached a specific position on the keyboard 20 namely, the lower left corner of the same imaginary rectangular box 23 described in 1 above. It should be noted, however, that the "L" shaped ridge could be formed by two separate ridges, one on the bottom border and one on the left border.

Figure 2E:
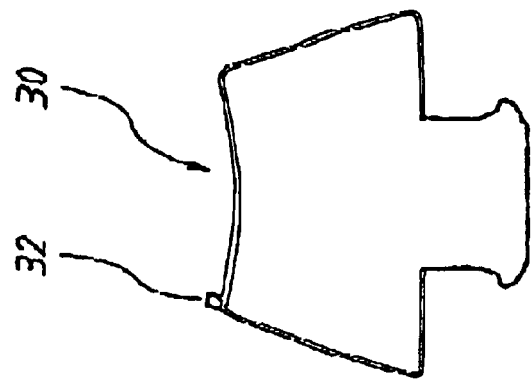
Figure 2E:
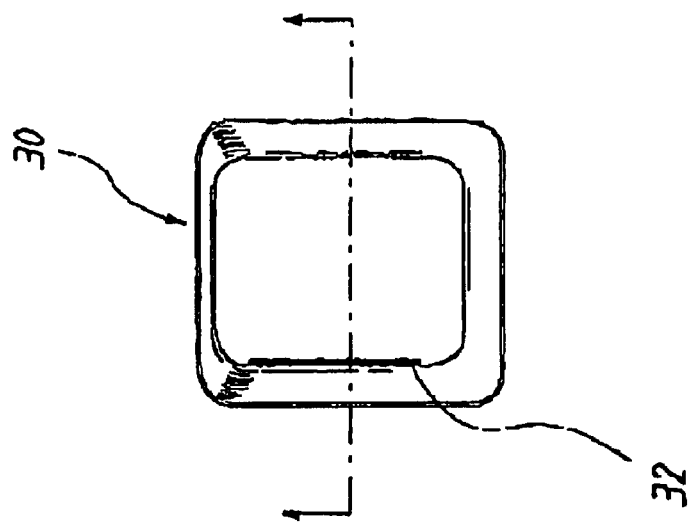
Figure 2E:
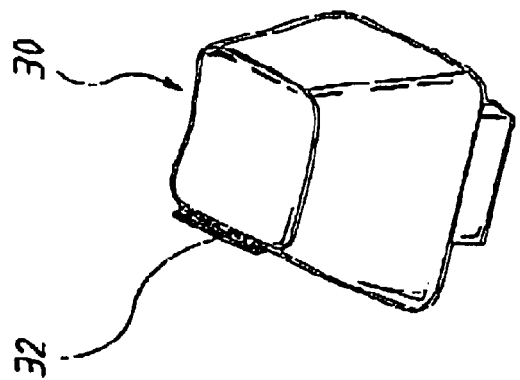
Figure 2F:
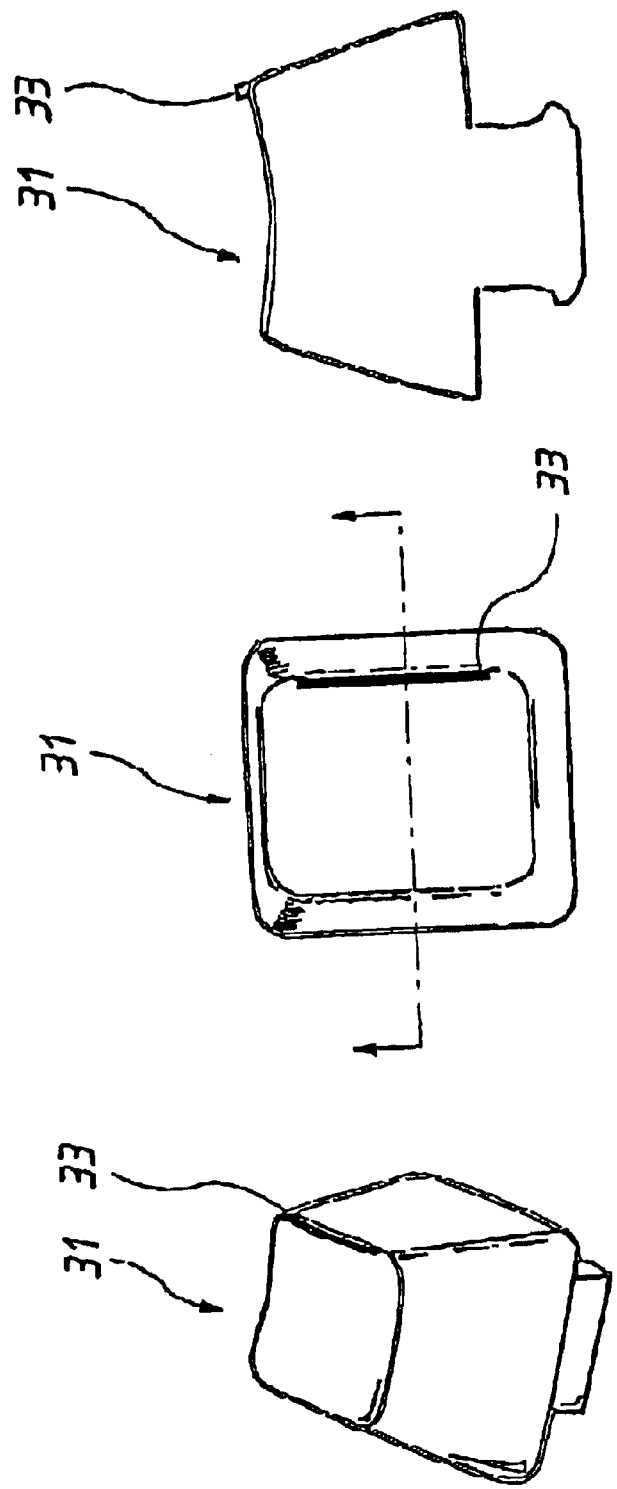
Figure 2G:
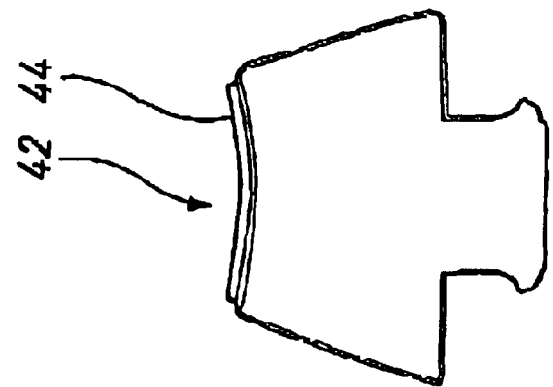
Figure 2G:
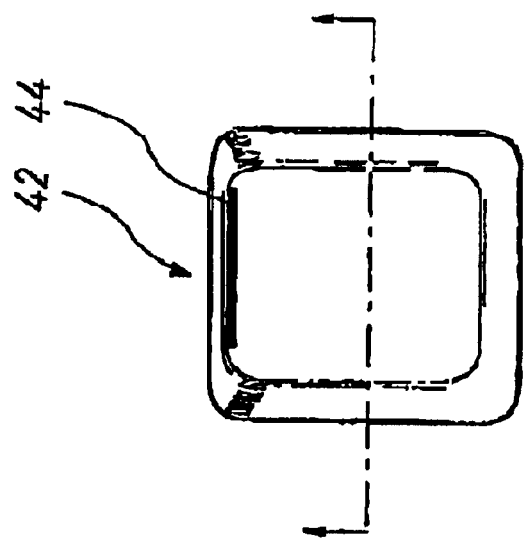
Figure 2G:
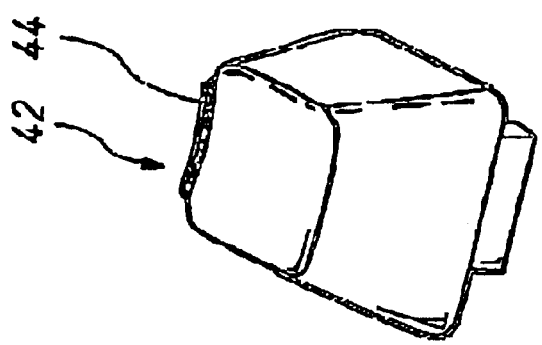

5. The keys "A" 30 and "F" 31 each have one ridge 32, 33 applied to the left border in the case of the key "A" 30 and to the right border in the case of the home key "F" 31 (FIG. 2E and FIG. 2F). These ridges 32, 33 are designed so that they provide the two fingers designated to use these keys with the feedback information that the fingers are in a "middle" row since the feedback is that of a lateral ridge without a corner. In other words, the finger senses that it is not in a "corner" position.

6. The key "U" 34 has a generally "L" shaped ridge applied to the top border and to the left border (similar to as shown in FIG. 2A). The ridge is designed so that it will provide a finger with the feedback information that it has reached a specific position on the keyboard namely, the upper left corner of an imaginary rectangular box 35 formed by the keys U, I, O, P, ;, /, >, <, M, J. It should be noted, however, that the "L" shaped ridge could be formed by two separate ridges, one on the top border and one on the left border.

7. The key "P" 36 has a generally "L" shaped ridge applied to the top border and to the right border (similar to as shown in FIG. 2B). The ridge is designed so that it will provide a finger with the feedback information that it has reached a specific position on the keyboard namely, the upper right corner of the same imaginary rectangular box 35 described in 6 above. It should be noted, however, that the "L" shaped ridge could be formed by two separate ridges, one on the top border and one on the right border.

8. The key "M" 37 has a generally "L" shaped ridge applied to the bottom border and to the left border (similar to as shown in FIG. 2D). The ridge is designed so that it will provide a finger with the feedback information that it has reached a specific position on the keyboard namely, the lower left corner of the same imaginary rectangular box 35 described in 6 above. It should be noted, however, that the "L" shaped ridge could be formed by two separate ridges, one on the bottom border and one on the left border.

9. The key "/" 38 has a generally "L" shaped ridge applied to the bottom border and to the right border (similar to as shown in FIG. 2C). The ridge is designed so that it will provide a finger with the feedback information that it has reached a specific position on the keyboard namely, the lower right corner of the same imaginary rectangular box 35 described in 6 above. It should be noted, however, that the "L" shaped ridge could be formed by two separate ridges, one on the bottom border and one on the right border.

10. The keys "J" 39 and ";" 40 each have one ridge applied to the left border in the case of the house key "J" 39 and to the right border in the case of the key ";" 40 (similar to as shown in FIG. 2E and FIG. 2F). These ridges are designed so that they provide the two fingers designated to use these keys with the feedback information that the fingers are in the middle row of the same imaginary rectangular box 35 described in 6 above.

In the same manner the numerical keys QWERTY keyboard 10 shown in FIG. 1, have been modified so that they provide the same positive feedback information and the fingers can operate within a "box" 41 formed by "walls" applied to the keys "7,", "8", "9", "4", "6", "1", "and 3". It can be seen that the modifications are identical to those for similarly positioned keys of the alphabetical portion of the keyboard 20, except for keys "8" 42 and "2" 43, thus:

1. The key "7" has a generally "L" shaped ridge applied to the top and to the left border (similar to as shown in FIG. 2A). The ridge is designed so that it will provide a finger with the feedback information that it has reached a specific position on the keyboard 20 namely, the upper left corner of an imaginary rectangular box 41 formed by the keys 7, 8, 9, 6, 3, 2, 1, 4.

2. The key "9" has a generally "L" shaped ridge applied to the top border and to the right border (similar to as shown in FIG. 2B). The ridge is designed so that it will provide a finger with the feedback information that it has reached a specific position on the keyboard 20 namely, the upper right corner of the same imaginary rectangular box 41 described in 1 above.

3. The key "3" has a generally "L" shaped ridge applied to the bottom border and to the right border (similar to as shown in FIG. 2C). The ridge is designed so that it will provide a finger with the feedback information that it has reached a specific position on the keyboard 20 namely, the lower right corner of the same imaginary rectangular box 41 described in 1 above.

4. The key "1" has a generally "L" shaped ridge applied to the bottom border and to the left border (similar to as shown in FIG. 2D). The ridge is designed so that it will provide a finger with the feedback information that it has reached a specific position on the keyboard 20 namely, the lower left corner of the same imaginary rectangular box 41 described in 1 above.

5. The key "4" has one ridge applied to the left border (similar as shown in FIG. 2E) which ridge is so designed so that it provides the finger with the feedback information that it has reached a specific position on the keyboard 20 namely, the left middle edge of the same imaginary rectangular box 41 described in 1 above.

6. The key "6" has one ridge border (similar as shown in FIG. 2F) which ridge is so designed so that it provides the finger with the feedback information that is has reached a specific position on the keyboard 20 namely, the right middle edge of the same imaginary rectangular box 41 described in 1 above.

7. The key "8" 42 has one ridge 44 applied to the top border (similar as shown in FIG. 2C) which ridge is so designed so that it provides the finger with the feedback information that it has reached a specific position on the keyboard 20 namely, the top middle edge of the same imaginary rectangular box 41 described in 1 above.

Figure 2H:
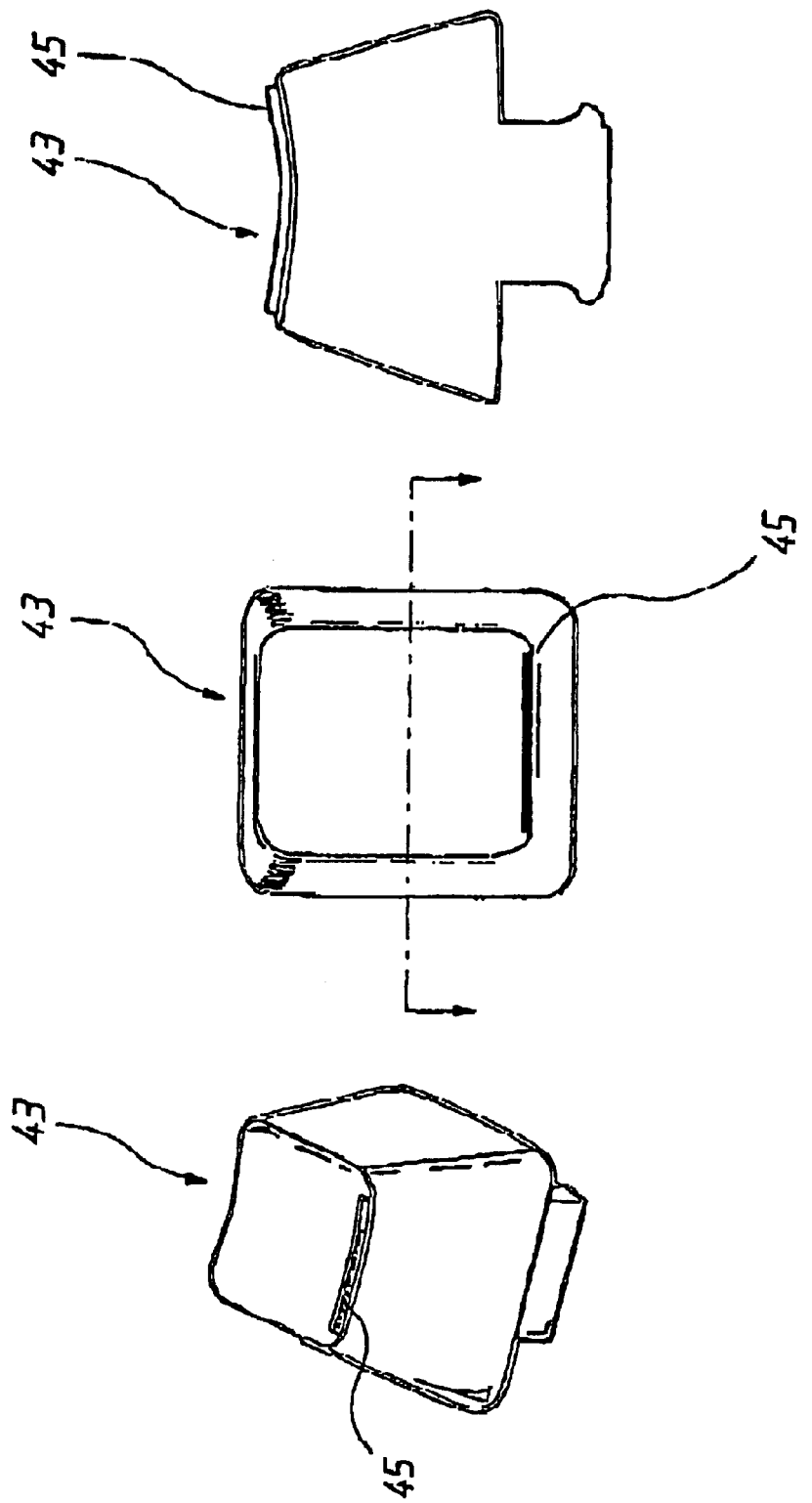

8. The key "2" 43 has one ridge 45 applied to the bottom border (similar to shown in FIG. 2H) which ridges is so designed so that it provides the finger with the feedback information that it has reached a specific position on the keyboard 20 namely, the bottom middle edge of the same imaginary rectangular box 41 described in 1 above.

It can be seen that the identical modification described above can be used if desired to modify the directional keys 46 used to move the cursor around the screen of a computer and which are known as the "inverted T", or similarly the functional keys 47 ("Insert", "Home", "PageUp", "Delete", "End", "PageDown"), to obtain similar locational feel and feedback.

It can also be seen that the modifications described in number 5 and 6 above, can be used, if desired, to modify the keys "1", "4", "7", "0" 48 of the row 15 of the QWERTY keyboard 10 of FIG. 1 one obtains similar locational feel and feedback.

Further keys of the QWERTY keyboard or similar keyboards could be modified such that the keys corresponding to "W", "E", "I", "O", all have a ridge applied to the top of the respective key similar to the ridge of the key "K" as described in number 7 above. Similarly, keys "X", "C", "<", ">", could also each respectively have a ridge applied to the bottom of each respective key similar to the ridges of key "2" as described in number 8 above. In this way, a more defined "box" is obtained within which the fingers of the left or right hand are obliged to move.

It can therefore also be seen that a key having a ridge on a top or bottom border provides a geometric indicator stimulating the user as to the location of the finger within the respective box. This also indicates whether the user's finger is parallel or normal to a particular row.

While the above description contains many specificitics, these should not be construed as limitations on the scope of the invention, but rather as an exemplification of one preferred embodiment thereof. For example, different standard keyboards can be similarly modified. Additionally, the "walls" on the keys can be of different height, thickness, shape and appearance and still activate the feedback which is the subject of this invention. Additionally, this invention may be applied to keyboards or keypads modified to curved surfaces such as the "Microscoft Natural Keyboard" and equivalent keyboards, or using non-alphanumeric keys or designations, chording capabilities, single or multiple-hand designs, or miniaturization. Additionally, the invention may be applied to keypads used on telephones, calculators, cash registers, electrical appliances and other electronic devices. The keys may be integral with the keypad or the ridges can be formed of plastic material with a self-adhesive backing for attachment to keys of a "normal" keyboard or keypad.

Although the invention has been described with reference to specific examples, it will be appreciated by those skilled in the art that the invention may be embodied in many other forms.

What is claimed is:

1. A keyboard or keyboard including at least three rows of keys including a top row which is remote from a user, a middle row, and a bottom row which is adjacent the user, each row having at least three keys including a left and a right end key, each key having an upper finger engaged surface of generally square or rectangular configuration so as to have top and bottom edge portions extending generally parallel to the rows, and left and ridge edge portions extending generally normal to the rows, and wherein the keys include:

(i) a ridge on the top left end key adjacent the top edge portion thereof extending generally parallel to the rows, (ii) a ridge on the top left end key adjacent the left edge portion thereof extending generally normal to the rows, (iii) a ridge on the bottom left end key adjacent the left edge portion thereof extending generally normal to the rows, (iv) a ridge on the bottom left end key adjacent the bottom edge portion thereof extending generally parallel to the rows, (v) a ridge on the bottom right end key adjacent the bottom edge portion thereof extending generally parallel to the rows, (vi) a ridge on the bottom right end key adjacent the right edge portion thereof extending generally normal to the rows, (vii) a ridge on the top right end key adjacent the right edge portion thereof extending generally normal to the rows, and (viii) a ridge on the top right end key adjacent the top edge portion thereof extending generally parallel to the rows.

2. The keyboard or keypad of claim 1 wherein any key between said top left end key and said bottom left end key has a right adjacent the left edge portion thereof extending generally normal to the rows, and any key between said top right end key and said bottom right end key has a ridge adjacent the right edge portion thereof extending generally normal to the rows.

3. The keyboard or keypad of claim 1 wherein any key between said top left end key and said right top end key has a ridge adjacent the top edge portion thereof extending generally parallel to the rows, and any key between said bottom left end key and said right bottom end key includes a ridge adjacent the bottom edge portion thereof extending generally parallel to the rows.

4. A Qwerty keyboard having a plurality of alphanumeric keys arranged in three linear rows including a top row which is remote from a user, a middle row, and a bottom row which is adjacent the user, each row having a left and a right end key, each key having an upper finger engaged surface of generally square or rectangular configuration so as to have top and bottom edge portions extending generally parallel to the rows, and left and right side edge portions extending generally normal to the rows, the keys being positioned in a left first set and a right second set, the first set including the three left end keys and at least the next two or three adjacent keys of each row, the second set including the three right end keys and the next adjacent two or three keys spaced toward the first set so that the two sets are spaced by two, three or four keys, and wherein the keys of said first set include:

(i) a ridge on the top left end key adjacent the upper edge portion thereof extending generally parallel to the rows, (ii) a ridge on the top left end key adjacent the left edge portion thereof extending generally normal to the rows, (iii) a ridge on the middle left end key adjacent the left edge portion thereof extending generally normal to the rows, (iv) a ridge on the bottom left end key adjacent the left edge portion thereof extending generally normal to the rows, (v) a ridge on the bottom left end key adjacent the bottom edge portion thereof extending generally parallel to the rows, (vi) a ridge on the next adjacent or next two adjacent keys to said bottom left end key of the bottom row adjacent the bottom edge portion thereof extending generally parallel to the rows, (vii) a ridge on the next adjacent bottom key adjacent the bottom edge portion thereof extending generally parallel to the rows, (viii) a ridge on said last mentioned key adjacent the ridge edge portion thereof extending generally normal to the rows, (ix) a ridge on the middle key next adjacent to said last mentioned key adjacent the right edge portion thereof extending generally normal to the rows, (x) a ridge on the top key next adjacent said last mentioned key adjacent the right edge portion thereof extending generally normal to the rows, (xi) a ridge on said last mentioned key adjacent the top edge portion thereof extending generally parallel to the rows, (xii) a ridge on the or each top key between said last mentioned key and said top left end key adjacent the top edge portion thereof extending generally parallel to the rows, and keys of said second set include:

(i) a ridge on the top right end key adjacent the upper edge portion thereof extending generally parallel to the rows, (ii) a ridge on the top right end key adjacent the ridge edge portion thereof extending generally normal to the rows, (iii) a ridge on the middle key adjacent said top right key adjacent the right edge portion thereof extending generally normal to the rows, (iv) a ridge on the bottom right end key adjacent the right edge portion thereof extending generally normal to the rows, (v) a ridge on the bottom right end key adjacent the bottom edge portion thereof extending generally parallel to the rows, (vi) a ridge on the next adjacent or next two adjacent keys to said bottom right end key of the bottom row adjacent the bottom edge portion thereof extending generally parallel to the rows, (vii) a ridge on the next adjacent bottom key adjacent the bottom edge portion thereof extending generally parallel to the rows, (viii) a ridge on said last mentioned key adjacent the left edge portion thereof extending generally normal to the rows, (ix) a ridge on the middle key next adjacent to said last mentioned key adjacent the left edge portion thereof extending generally normal to the rows, (x) a ridge on the top key next adjacent said last mentioned key adjacent the left edge portion thereof extending generally normal to the rows, (xi) a ridge on said last mentioned key adjacent the top edge portion thereof extending generally parallel to the rows, (xii) a ridge on the or each top key between said last mentioned key and said top right end key adjacent the top edge portion thereof extending generally parallel to the rows.

5. The Qwerty keyboard of claim 4 wherein each set includes four keys from each row so that the two sets are spaced by two keys in each row.

6. The Qwerty keyboard of claim 4 wherein the two ridges of each end key meet.

7. The keyboard or keypad of claim 2 wherein any key between said top left end key and said right top end key has a ridge adjacent the top edge portion thereof extending generally parallel to the rows, and any key between said bottom left end key and said right bottom end key includes a ridge adjacent the bottom edge portion thereof extending generally parallel to the rows.

8. The Qwerty keyboard of claim 5 wherein the two ridges of each end key meet.

* * * * *